United States Patent [19]

Ishikawa et al.

[11] Patent Number: 4,739,347

[45] Date of Patent: Apr. 19, 1988

[54] INK SUPPLY SYSTEM FOR USE IN AN INK-JET PRINTER

[75] Inventors: Chuji Ishikawa; Michio Umezawa, both of Kawasaki, Japan

[73] Assignee: Ricoh Company, Ltd., Tokyo, Japan

[21] Appl. No.: 886,420

[22] Filed: Jul. 17, 1986

[30] Foreign Application Priority Data

Jul. 17, 1985 [JP] Japan .............................. 60-157744
Jul. 17, 1985 [JP] Japan .............................. 60-157745

[51] Int. Cl.$^{4}$ .............................................. G01D 15/18

[52] U.S. Cl. .................................... 346/140 R; 346/75

[58] Field of Search .............................. 346/75, 140 R

[56] References Cited

U.S. PATENT DOCUMENTS 4,503,442 3/1985 Barbero et al. ................. 346/140 R
4,504,845 3/1985 Kattner et al. .................. 346/140 R

*Primary Examiner*—Clifford C. Shaw
*Assistant Examiner*—Gerald E. Preston
*Attorney, Agent, or Firm*—Oblon, Fisher, Spivak, McClelland & Maier

[57] ABSTRACT

An ink supply system for use in an ink-jet printer includes a main block preferably comprised of a plastic material and defining part of a carriage of the printer. A valve assembly having an ink chamber is incorporated in the main body which controls the flow of ink from an ink reservoir formed in the main block to an ink-jet nozzle head mounted on the carriage. A plurality of ink passages are formed inside of the main body establishing fluidic communications between the ink reservoir, ink chamber and the nozzle head, thereby requiring to provide no tubing.

8 Claims, 4 Drawing Sheets

INK SUPPLY SYSTEM FOR USE IN AN INK-JET PRINTER

BACKGROUND OF THE INVENTION

1. Field of the Invention

This invention relates to an ink-jet printer, and, in particular, to an ink supply system for use in an ink-jet printer. More specifically, the present invention relates to an ink supply system particularly suitable for use in an ink-jet printer of the type in which ink droplets are formed, selectively charged and deflected by an electric field.

2. Description of the Prior Art

FIG. 6 shows a prior art ink supply system for use in an ink-jet printer disclosed in Japanese Patent Laid-open Pub. No. 58-56867, assigned to the assignee of this application. As shown, the ink supply system includes a valve assembly 20 which is provided with an ink chamber 21 which, in turn, is in fluidic communication with an inlet port 22 at one end, with a discharge port 23 at the opposite end, and with an outlet port 24 in the middle. Within the ink chamber 21 is provided a horizontally elongated cylinder 30 for receiving therein a valve member, and the cylinder 30 may be moved reciprocatingly by a lever 40 which is pivotally supported at an O-ring 50. When a solenoid coil 80 is energized, a plunger 60 is pulled in the direction indicated by the arrow A, so that the cylinder 30 is caused to move in the direction indicated by the arrow A'. On the other hand, when the solenoid coil 80 is deenergized, the plunger 60 is pushed in the direction indicated by the arrow B by means of a return spring 70, so that the cylinder 30 is caused to move in the direction indicated by the arrow B'. In this manner, the cylinder 30 is moved back and forth within the ink chamber 21 depending on energization and deenergization of the solenoid coil 80.

Within the cylinder 30 are provided an inlet side valve member 31 provided with a rubber sheet 34, a discharging side valve member 32 provided with a rubber sheet 35 and a valve spring 33 extending between the two valve members 31 and 32. The inlet port 22 may be set open or closed depending on whether the rubber sheet 34 of the inlet side valve member 31 is brought into contact or out of contact with the inlet port 22. Similarly, the rubber sheet 35 of the discharging side valve member 32 may be brought into or out of contact with the discharging port 23 to set it open or closed. The inlet port 22 is in fluidic communication with an ink-jet nozzle head (not shown) via a tube of plastic or the like (not shown) and the discharging port 23 is in fluidic communication with an ink reservoir (not shown) via a tube of plastic or the like (not shown). The valve assembly 20 is typically mounted on a stationary frame of a printer or the like and it is fluidic communication with the ink-jet nozzle head mounted on a reciprocatingly movable carriage (not shown) via a plastic tube or the like.

Describing the operation of the valve assembly 20, FIG. 7*a* shows a condition when the valve assembly 20 is set in a closed state, wherein the inlet port 22 is closed by the valve member 31 and the discharging port 23 is set in fluidic communication with the ink chamber 21 so that the ink is discharged out of the ink chamber 21 into an ink reservoir (not shown). FIG. 7*b* shows a transitional state in which the valve assembly 20 changes from an off condition to an on condition, whereby the inlet and discharging ports are once closed at the same time temporarily. FIG. 7*c* shows when the valve assembly 20 is set in an open condition, wherein the inlet port 22 is set open and the discharging port 23 is closed, so that the ink supplied into the ink chamber 21 from the inlet port 22 is forwarded to the ink-jet nozzle head through the outlet port 24. Of course, the valve assembly 20 goes through the transitional state shown in FIG. 7*b* when it is changed from the on condition to the off condition.

In the valve assembly 20 described above, it is constructed as a separate unit and fixedly mounted on a frame of a printer. And, the inlet, discharging and outlet ports 22, 23 and 24 are provided as projecting outwardly from the body of the valve assembly 20. For this reason, there must be provided tubes for establishing fluidic connections between these ports 22, 23 and 24 to various other components, such as an ink reservoir, pump and ink-jet nozzle head. Such a structure is disadvantageous because the connection tubes are constantly set in motion due to the reciprocating motion of the carriage on which the ink-jet nozzle head is mounted, and, thus, the ink pressure inside of the tubes may vary, which could cause fluctuations in printed characters. Besides, such tubes are relatively long and thus large in pressure drops, which could result in slow response speed. Furthermore, there is an increased chance of drawing air into the ink-jet nozzle, which could cause unstability in the formation of ink droplets.

SUMMARY OF THE INVENTION

In accordance with the present invention, there is provided an ink supply system for use in an ink-jet printer, which is constructed in an integrated form in a carriage of the printer on which an ink-jet nozzle head is mounted. Thus, in one embodiment, the carriage of the ink-jet printer is provided with an ink reservoir containing therein a quantity of ink, and the ink is supplied under pressure to a valve assembly by means of a pump, which are also mounted on the carriage. The valve assembly is in fluidic communication with an ink-jet nozzle head mounted on the carriage. Fluid communication passages among the ink reservoir, valve assembly and ink-jet nozzle head are defined by channels formed in a body. In the preferred embodiment, the valve assembly of the ink supply system includes a vertically extending ink chamber which is provided with a pair of first and second ports provided at opposite side walls in an opposed relation in the horizontal direction, and a pivotal lever extends into the ink chamber with its tip end engageable with the first and second ports, thereby closing them selectively. The tip end is preferably provided with a rubber member which comes into contact with the first and second ports selectively.

It is therefore a primary object of the present invention to obviate the disadvantages of the prior art as described above and to provide an improved ink supply system for use in an ink-jet printer.

Another object of the present invention is to provide an ink supply system including an improved valve assembly for controlling the flow of ink between an ink reservoir and an ink-jet nozzle head.

A further object of the present invention is to provide an improved ink supply system for use in an ink-jet printer of the type in which ink droplets are formed, electrically charged selectively and deflected as desired.

A still further object of the present invention is to provide an ink supply system for use in an ink-jet printer compact in size, low in cost and reliable in operation.

A still further object of the present invention is to provide an ink supply system for use in an ink-jet printer which is incorporated into a carriage of the printer.

Other objects, advantages and novel features of the present invention will become apparent from the following detailed description of the invention when considered in conjunction with the accompanying drawings.

DESCRIPTION OF THE PREFERRED EMBODIMENTS

Figure 1:
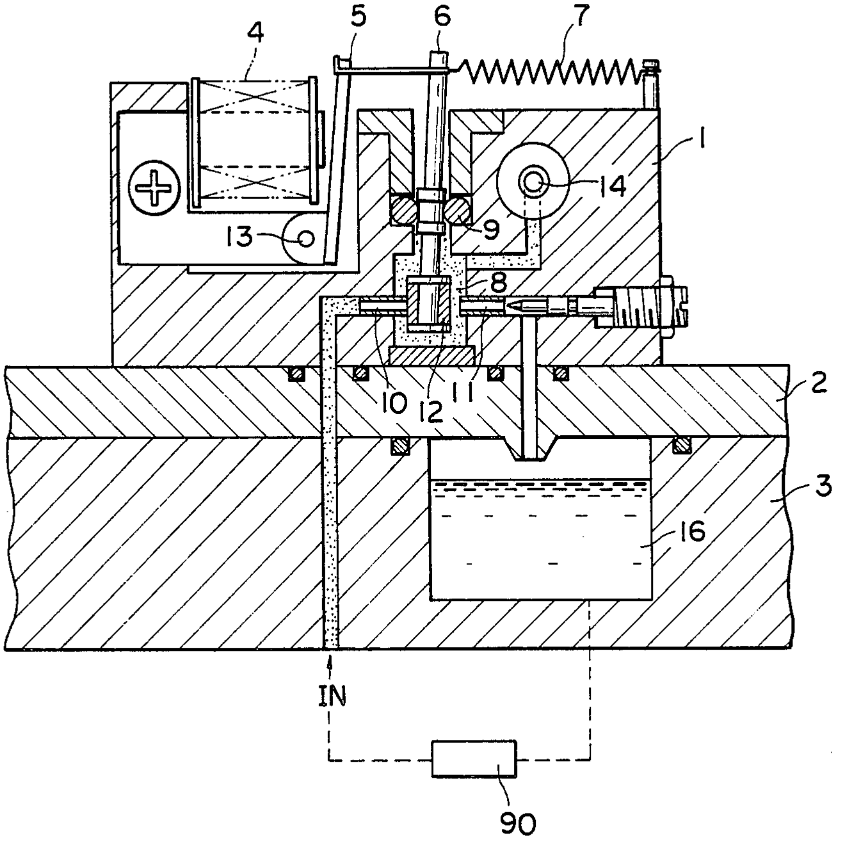
FIG. 1 is a schematic illustration in cross section showing an ink supply system in an on condition incorporated in a carriage of an ink-jet printer and constructed in accordance with one embodiment of the present invention.

Referring now to FIGS. 1 through 5, there is schematically shown an ink supply system constructed as incorporated in a carriage of an ink-jet printer of the type in which ink droplets are formed in series, electrically charged selectively and deflected as desired by an electric field. As shown, the present ink supply system includes a main body comprised of a first block 1, a second block 2 and a third block 3. It is to be noted that the main body constitutes part of a carriage of an ink-jet printer, which moves along a platen in a reciprocating manner. The first block 1 defines a body of a valve assembly for controlling the flow of ink to an ink-jet nozzle head 15 which is mounted on the carriage. These three blocks 1, 2 and 3 are preferably comprised of a plastic material and they are fixedly mounted one on top of another sealingly, for example, by ultrasonic fusing or screws. Ink passages are defined by channels engraved in these blocks 1 through 3 and the connection of the ink passages at the interface between the two adjacent blocks is sealed by an O-ring.

A solenoid 4 is fixedly mounted on the first block by means of screws, and an armature 5 is provided with its base end pivotted at 13 in operative association with the solenoid 4. The first block 1, defining the main body of a valve assembly, is provided with an internal ink chamber 8 which is somewhat elongated in the vertical direction. An inlet port 10 is provided at one side wall of the ink chamber 8 and a discharging port 11 is provided in the side wall of the ink chamber 8 in an opposed relation to the inlet port 10 in the horizontal direction. These inlet and discharging ports 10 and 11 are defined by metal pipes whose tips are somewhat narrowed so as to increase the sealing characteristic. In the illustrated embodiment, the inlet and discharging ports 10 and 11 are located approximately at half of the height of the ink chamber 8 and they project into the ink chamber 8. Also provided is an actuator lever 6 which is pivotally supported by an O-ring 9 which also serves an a seal against the ink inside of the ink chamber 8. The pivotally supported lever 6 extends generally vertically and has its bottom tip end located inside of the ink chamber 8 and its top end located in the vicinity of the armature 5. The top end of the pivotally supported lever 6 is operatively coupled to the armature 5 by means of a connector. The top end of the lever 6 is also engaged with one end of a coil spring which has its other end engaged with a stopper projection of the first block 1. Thus, the lever 6 is normally pivotted clockwise as viewing into FIG. 1 as pulled by the coil spring 7 so that a rubber member 12 mounted at the bottom tip end of the lever 6 is brought into contact with and thus close the inlet port 10 when the slenoid 4 is deenergized.

Figure 3:
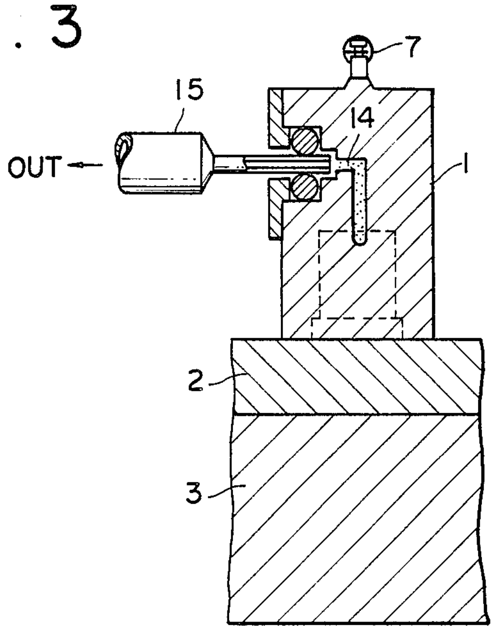
FIG. 3 is a schematic illustration showing how the present ink supply system is in fluidic communication with an ink-jet nozzle head mounted on the carriage of the printer.

Also defined in the first block 1 is an outlet passage 14 which extends from the ink chamber 8 to an ink-jet nozzle head 15 which is mounted on the carriage above the ink chamber 8, as best shown in FIG. 3. It is to be noted that the ink nozzle in the head 15 has a diameter in the order of 30 microns and the ink passages defined in the blocks 1, 2 and 3 have a diameter in the order of 1 mm. Although not shown, a piezo-electric element is fixedly mounted on the head 15 for providing an oscillation to the ink inside of the ink-jet nozzle of the head 15, so that the ink, when discharged out of the nozzle head 15, forms a series of ink droplets which are selectively used for printing. An ink reservoir 16 is formed as a recess in the third block 3, and the reservoir 16 contains a quantity of ink and is open to the atmosphere, though not shown specifically. Also provided in the present ink supply system is a high frequency solenoid pump 90 which has its one end in fluidic communication to the ink reservoir 16 and its other end in fluidic communication to an ink passage leading to the inlet port 10. Since the pump 90 normally pumps the ink during operation, the ink inside of the ink passage leading to the inlet port 10 from the pump 90 is under pressure. However, the ink under pressure is not supplied into the ink chamber 8 because the rubber member 12 of the actuator lever 6 is pressed against the inlet port 10 to have it closed under the force of the coil spring 7.

When the solenoid 4 is energized, the armature 5 is pulled toward the solenoid against the force of the coil spring 7, so that the actuator lever 6 is pivotted counterclockwise as viewing into the drawing, and, thus, the rubber member 12 of the lever 6 is moved separated away from the inlet port 12 toward the discharging port 8. Thus, the inlet port 10 is set open, thereby establishing a fluidic communication between the inlet port 10 and the ink chamber 8, which allows the ink under pressure to be supplied into the ink chamber 8. However, since the rubber member 12 is pressed against the discharging port 11 to set in a sealingly closed condition, the ink inside of the ink chamber 8 does not flow back to the ink reservoir 16. On the other hand, the ink supplied into the ink chamber 8 is then supplied toward the ink-jet nozzle head 15 through the outlet passage 14. Thus, the ink may be constantly supplied from the ink reservoir 16 to the ink-jet nozzle head 15 via the pump 90, ink chamber 8 and the outlet passage 14, and the ink is discharged into the air in the form of a series of ink droplets. It should thus be appreciated that the solenoid 4 is maintained on during printing operation. The ink droplets, which are not used for printing, are collected by a gutter (not shown) and returned to the ink reservoir 16 via a collection passage (not shown). It should also be appreciated that a filter may be inserted between the pump 90 and the ink reservoir 16 so as to collect debris or any foreign matter. Thus, the valve assembly incorporated in the first block 1 is maintained in an on condition as shown in FIG. 2 while the printer is in an operating condition.

Figure 4:
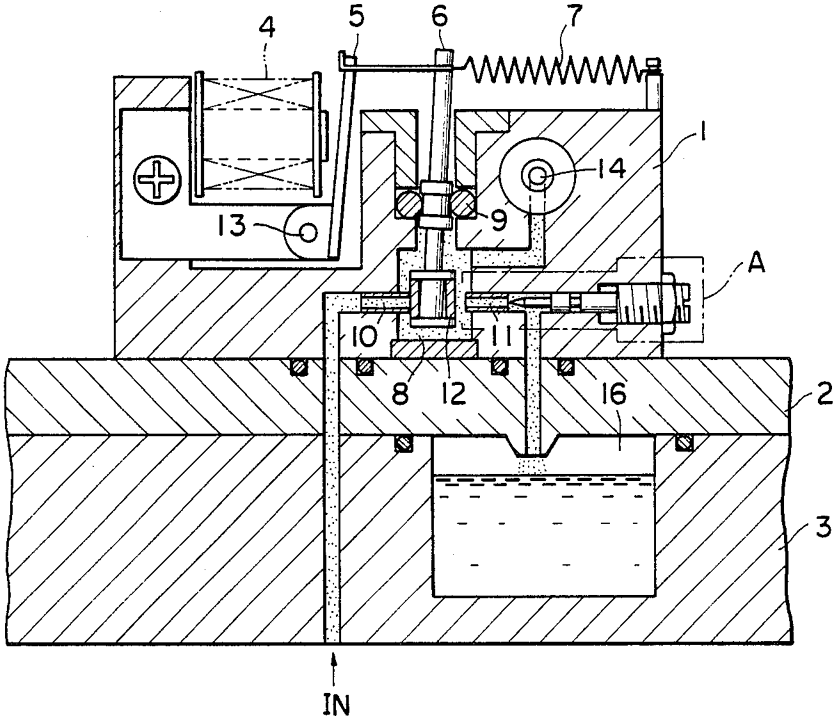
FIG. 4 is a schematic illustration showing the present ink supply system at the moment when the condition has just changed from the on condition to the off condition.

Upon completion of printing, a termination signal is supplied from a controller (not shown) of the printer to the solenoid 4, so that the selenoid 4 is deenergized, which causes the lever 6 to pivot clockwise under the force of the spring 7. Accordingly, the rubber member 12 is disengaged from the discharging port 11 and brought into sealing contact with the inlet port 10. This condition is shown in FIG. 4. Under the condition, since the ink is supplied under pressure from the pump 90, the ink inside of the ink chamber 8 is still at high pressure at the moment when the rubber member 12 has been switched from the discharging port 11 to the inlet port 10. Besides, the ink-jet nozzle of the nozzle head 15 has a much smaller diameter than the ink passages formed in the blocks 1, 2 and 3, so that the ink-jet nozzle presents a higher fluidic resistance. As a result, the ink under pressure inside of the ink chamber 8 tends to flow out of the ink chamber 8 through the discharging port 11 toward the ink chamber 16, as shown in FIG. 4.

Figure 2:
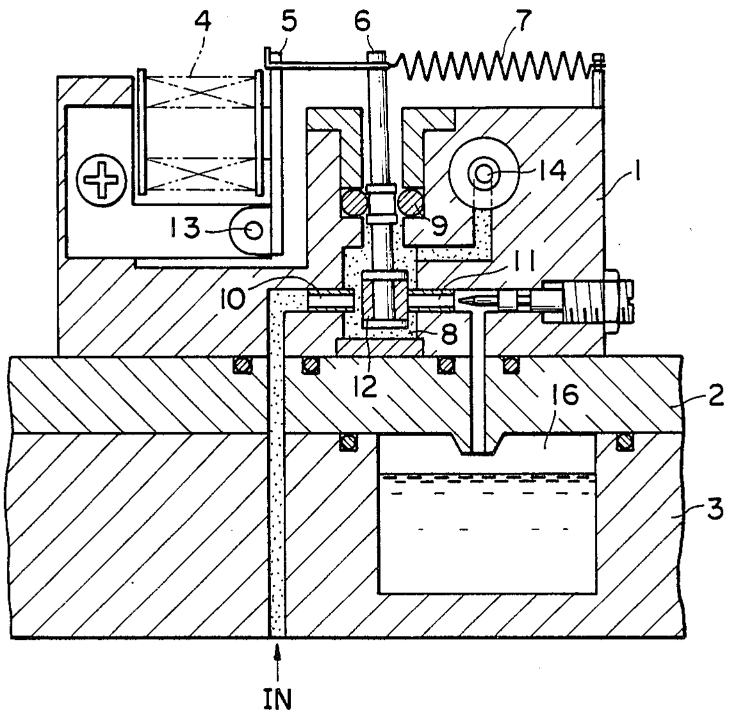
FIG. 2 is a schematic illustration showing the present ink supply system when it is in an off condition.

As described above, at the time when the valve member has been switched from the on condition of FIG. 2 to the off condition of FIG. 4, the ink inside of the ink chamber tends to flow toward the ink reservoir 16 because of the residual pressure inside of the ink chamber 8 and the difference in fluidic resistance between the passage leading from the ink chamber 8 to the ink-jet nozzle of the nozzle head 15 and the passage leading from the ink chamber 8 to the ink reservoir 16. In this respect, if the fluidic resistance at the discharging port is much smaller than the fluidic resistance at the outlet port side, then the ink inside of the ink chamber 8 is strongly drawn toward the ink reservoir 16, which could then cause the ink inside of ink-jet nozzle to be pulled toward the ink chamber 8, thereby intaking air into the nozzle head 15. Such an introduction of air into the nozzle head 15 is not advantageous because it could cause unstability in forming ink droplets when the ink is supplied again from the ink chamber 8 next time. To cope with this situation, it is preferable to provide an adjustable fluidic resistance element in the discharging passage.

Figure 5:
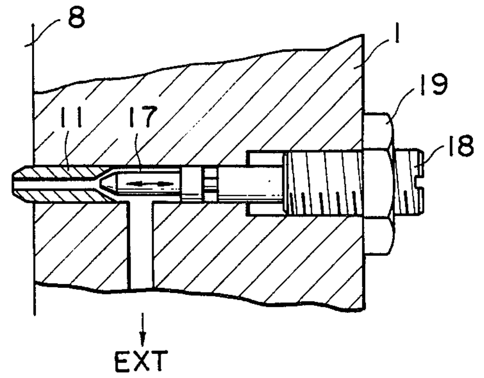
FIG. 5 is a schematic illustration showing on an enlarged scale a portion of the present ink supply system which is indicated by the one-dotted line A in FIG. 4.
Figure 6:
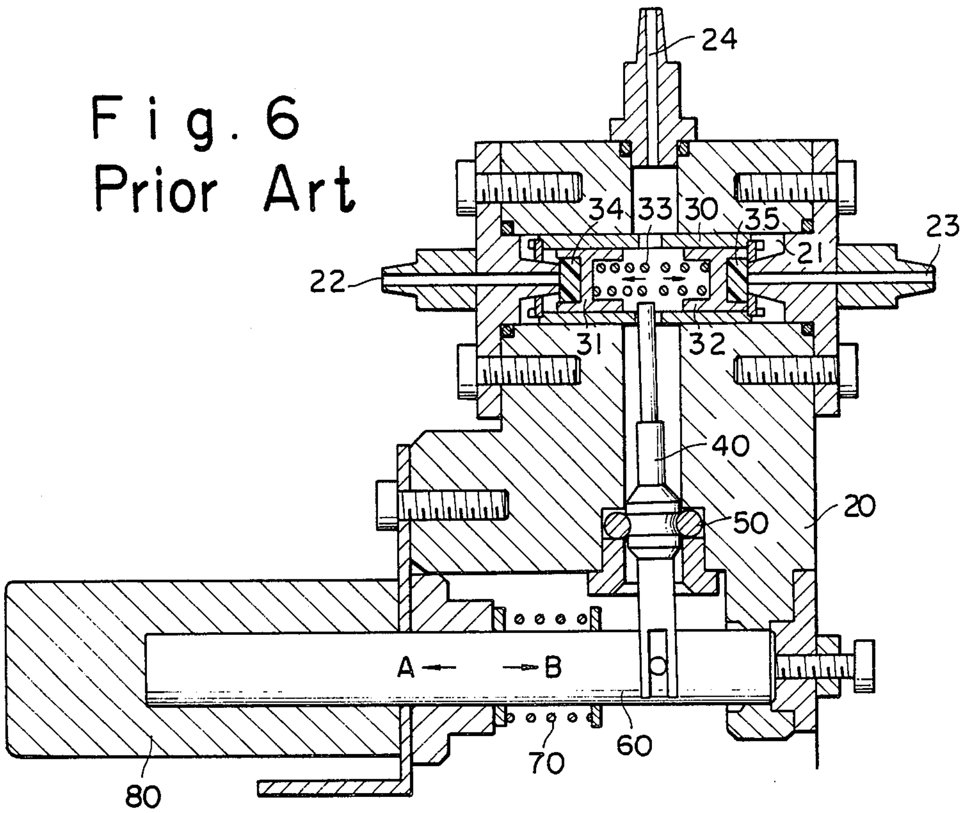
Fig. 6 Prior Art
FIG. 6 is a schematic illustration showing a prior art ink supply system for use in an ink-jet printer.
Figure 7A:
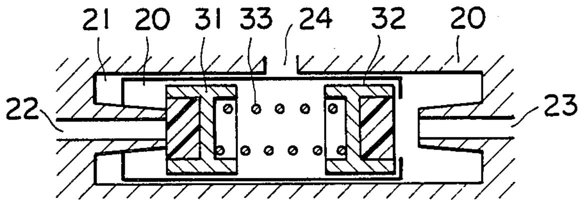
Fig. 7a Prior Art
FIGS. 7*a* through 7*c* are schematic illustrations useful for understanding the operation of the structure shown in FIG. 6.
Figure 7B:
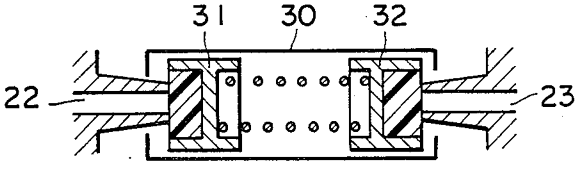
Fig. 7b Prior Art
Figure 7C:
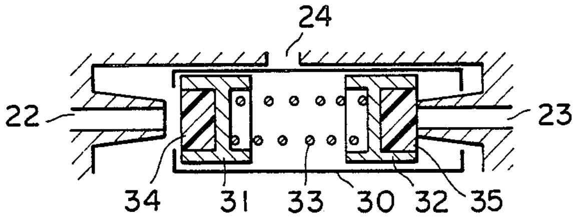
Fig. 7c Prior Art

As best shown in FIG. 5, in accordance with the preferred embodiment of the present invention, a needle 17 adjustable in position is provided in the vicinity of the discharging port 11. The needle 17 has its base end fixedly attached to a screw 18 which is threaded through a bolt 19 fixedly attached to the first block 1. Thus, the position of the needle 17 with respect to the discharging port 11 may be adjusted as indicated by the arrow by turning the screw 18 in a desired direction. With this structure, the fluidic resistance of the discharging passage leading from the discharging port 11 to the ink reservoir 16 may be set at a desired level in relation to the fluidic resistance presented by the ink passage leading from the ink chamber 8 to the ink-nozzle of the nozzle head 15, so that the introduction of air into the ink nozzle at the time when the valve assembly is switched from the on condition of FIG. 2 to the off condition of FIG. 4 may be prevented from taking place. In addition, the needle 17 may be moved to the position to close the discharging port 11, for example, when the printer is left unused for a long period of time or packed for shipping.

As described above, in accordance with the present invention, the ink passages are all defined by engraving channels in the blocks, preferably, of a plastic material. Thus, the ink passages may be defined mostly as straight passages, which could reduce pressure losses and increase reliability in operation. Since the present ink supply system is constructed as incorporated as part of a carriage of an ink-jet printer, the overall structure may be made compact in size. With the provision of an adjustable fluidic resistance element, the introduction of air into an ink-jet nozzle may be suitably avoided. Moreover, since the tip end of the pivotal lever 6 can directly carry out the on/off operation of the valve assembly, the stroke required for the lever 6 to carry out this on/off operation is minimized, which, in turn, allows to use a solenoid of smaller capacity.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. An ink supply system for use in an ink-jet printer, comprising:
- a main block forming part of a carriage of said printer;
- storing means formed in said main block for storing a quantity of ink;
- an ink chamber formed in said main block at an elevation higher than said storing means and provided with first, second and third ports;
- a first ink passage formed in said main block leading from said storing means to said first port of said ink chamber via a pump;
- a second ink passage formed in said main block leading from said second port of said ink chamber to said storing means;
- a third ink passage formed in said main block leading from said third port of said ink chamber to an ink-jet nozzle head mounted on said carriage at an elevation higher than said ink chamber; and
- closing means for closing said first and second ports selectively.

2. The system of claim 1 wherein said ink chamber is vertically elongated in shape and said first and second ports are provided in an opposed relation as projecting from opposite walls of said ink chamber, and wherein said closing means includes a pivotally supported lever having a bottom tip end which may be brought into a sealing contact with said first and second ports selectively.

3. The system of claim 2 wherein said lever is pivotally supported by an O-ring provided at top of said ink chamber.

4. The system of claim 3 wherein said lever is provided with a rubber member at the tip end and said rubber member is brought into a sealing contact with said first and second ports selectively.

5. The system of claim 1 wherein said main block is comprised of three blocks which are placed one on top of another sealingly.

6. The system of claim 5 wherein said ink chamber is formed in a topmost block and said storing means includes an ink reservoir which is formed in a bottommost block.

7. The system of claim 1 further comprising adjusting means for adjusting a level of fluidic resistance presented by said second ink passage.

8. The system of claim 7 wherein said adjusting means includes a needle valve provided in the vicinity of said second port.

* * * * *